Patented Mar. 18, 1924.

1,487,134

UNITED STATES PATENT OFFICE.

HARRY H. ALEXANDER, OF WESTFIELD, NEW JERSEY, ASSIGNOR TO AMERICAN SMELTING AND REFINING COMPANY, OF NEW YORK, N. Y., A CORPORATION OF NEW JERSEY.

PROCESS OF RECOVERING TIN.

No Drawing. Application filed October 25, 1920. Serial No. 419,475.

*To all whom it may concern:*

Be it known that I, HARRY H. ALEXANDER, a citizen of the United States, and resident of Westfield, in the county of Union and State of New Jersey, have invented certain new and useful Improvements in Processes of Recovering Tin, of which the following is a specification.

The invention relates in general to a process of recovering tin from tin containing material and relates particularly to a process of recovering the tin from tin bearing materials such as native ores or roasted and sintered stanniferous materials by using an alloy of iron and tin as a part of the reducing agent of the charge and at the same time recovering the tin from said material.

The primary object of the invention is to provide a simple method which can be practiced economically on a large commercial scale for extracting tin from impure ores, such as Bolivian ores, that contain other metals and also the tin forming part of the tin iron alloy, whereby a larger percentage of metallic tin may be obtained from such tin containing material than has been possible heretofore and to attain this result in an operation involving relatively few steps and with a minimum amount of reagents thereby featuring economy in operation.

In the smelting of tin ores in blast furnaces, the formation of a tin-iron alloy has been persistent despite efforts to prevent its formation. This product has heretofore been objectionable in the metallurgy of tin on account of its refractory character. In the present disclosure on the contrary the tin-iron alloy is desired and is utilized as a beneficial and desirable factor constituting a reducing agent in that it eliminates sulphur and results in a higher percentage of tin recovered.

The invention consists primarily in preparing a charge of sintered tin bearing material with coke as usual and adding to this charge the heretofore objectionable tin-iron alloy and subjecting the mixture to the action of a blast-furnace.

The sintered material may be the product of any tin bearing ores or concentrates. This sintered material is mixed with the iron tin alloy in a suitable amount, preferably not exceeding the theoretical amount required to reduce the tin oxides. A suitable fuel, such as coke, is also added in an amount sufficient to maintain and complete the reducing action. Silicious flux, such as slag from a previous blast furnace operation or silicious ore and also limestone may be added to the charge if necessary to produce a liquid slag. The charge is fed directly to a blast furnace and smelted therein under the usual smelting conditions, the metallic tin and other metals being withdrawn from time to time in the usual manner.

One method of producing the iron tin alloy which forms part of the charge is set forth in my co-pending application, Serial No. 419,474.

By means of this process the iron tin alloy, which heretofore has proven a most objectionable product in the treatment of tin ores in blast furnaces, is utilized not only for the value of the tin contained therein, but the value of the tin contained therein, but also as a reducing agent in the reactions taking place in the blast furnace. Preferably the charge is so proportioned that all of the iron found in the ore or the alloy will be carried over in the slag, and that as much as possible of the tin, together with other metals, will be reduced to the metallic state.

According to this process, approximately 85% to 90% of the tin can be recovered, the remaining tin being carried over with the iron in the slag in the form of stannous silicate and other compounds of tin.

Having thus described my invention, I claim:—

1. In the art of extracting metallic tin from tin containing material, the process which consists in sintering a charge of the tin containing materials with a fuel, mixing the sintered product with a silicious flux, limestone and a tin-iron alloy and subjecting the mixture to the action of a blast furnace.

2. In the art of extracting metallic tin from tin containing material, the process which consists in sintering a charge of the tin containing materials with a fuel, mixing the sintered product with a tin-iron alloy and subjecting the mixture to the action of a blast furnace.

3. In the art of recovering metallic tin from a sintered material containing a tin bearing material, the process which consists in mixing a tin-iron alloy with the sintered material and with fuel and subjecting the mixture to a blasting operation.

4. In the art of preparing a charge for a blasting furnace in the metallurgical recovery of tin, the process which consists in mixing a sintered mass of a tin-containing material with a tin-iron alloy with the necessary fuel and with the stanniferous slag and subjecting the mixture to a smelting operation.

5. In the art of recovering tin from tin containing materials, the process which consists in mixing a tin containing material with a tin-iron alloy as a reducing agent and with fuel and subjecting the mixture to a smelting operation.

6. In the art of recovering tin from tin containing materials, the process which consists in mixing a tin containing material with a tin-iron alloy as a part of the reducing charge and with a flux comprising stanniferous slag, and subjecting the same to a smelting operation.

HARRY H. ALEXANDER.